US006979711B2

(12) United States Patent
Franchina

(10) Patent No.: US 6,979,711 B2
(45) Date of Patent: Dec. 27, 2005

(54) FLUORINE EFFICIENT FINISHES FOR TEXTILES

(75) Inventor: Justine Gabrielle Franchina, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 10/957,945

(22) Filed: Oct. 4, 2004

(65) Prior Publication Data

US 2005/0107554 A1 May 19, 2005

Related U.S. Application Data

(60) Provisional application No. 60/523,157, filed on Nov. 18, 2003.

(51) Int. Cl.[7] .............................................. C08L 31/00

(52) U.S. Cl. ...................... 524/833; 524/755; 524/773; 524/831; 524/832; 525/326.2; 525/330.3; 525/330.5

(58) Field of Search ................................ 524/755, 773, 524/831, 832, 833; 525/326.2, 330.3, 330.5

(56) References Cited

U.S. PATENT DOCUMENTS

| | | | |
|---|---|---|---|
| 4,877,540 | A | 10/1989 | Engelhardt et al. |
| 5,039,739 | A | 8/1991 | Padget et al. |
| 5,344,903 | A | 9/1994 | Raiford et al. |
| 5,370,919 | A | 12/1994 | Fieuws et al. |
| 5,372,731 | A | 12/1994 | Michels et al. |
| 5,910,532 | A | 6/1999 | Schmidt et al. |
| 6,017,639 | A | 1/2000 | Higginbotham et al. |
| 6,344,243 | B1 | 2/2002 | McClain et al. |
| 6,369,178 | B1 | 4/2002 | McCarthy |
| 6,387,292 | B1 | 5/2002 | Saito |
| 6,479,605 | B1 | 11/2002 | Franchina |

FOREIGN PATENT DOCUMENTS

| | | | |
|---|---|---|---|
| EP | 234 724 | B1 | 10/1990 |
| EP | 0 798 349 | B1 | 10/1997 |
| EP | 1 236 783 | A1 * | 2/2001 |
| EP | 1 195 420 | A1 | 4/2002 |
| JP | 5-302271 | | 11/1993 |
| JP | 3241431 | B2 | 11/1993 |
| JP | 1994017034 | A | 1/1994 |
| JP | 1994248257 | A | 6/1994 |
| JP | 1994240238 | A | 8/1994 |
| JP | 1995179528 | A | 7/1995 |
| JP | 2002058303 | A | 2/2002 |
| WO | WO2000037583 | A1 | 6/2000 |
| WO | WO2000061696 | A1 | 10/2000 |
| WO | WO 02/103103 | A2 | 12/2002 |
| WO | WO 03/054284 | A1 | 7/2003 |

OTHER PUBLICATIONS

F. A. Donate, *P-series Glycol Ethers—Active Solvents in High Solids Systems, and Efficient Coupling Agents and Coalescents in waterborne Coatings*, Pitture a Venici—Paints and Varnishes Aug. 1997, p. 18-27.

* cited by examiner

*Primary Examiner*—Helen L. Pezzuto

(57) ABSTRACT

An improved emulsion polymerization process for producing an oil and water repellent finish for textiles wherein the improvement comprises polymerization in an aqueous solution containing 0.1 to 4.9% by weight of dipropylene-glycol monomethyl ether acetate or propylene glycol diacetate relative to water is disclosed.

8 Claims, No Drawings

FLUORINE EFFICIENT FINISHES FOR TEXTILES

FIELD OF THE INVENTION

This invention relates to a composition and process for preparing an aqueous emulsion composition of a fluorochemical (meth)acrylate copolymer for imparting a highly-durable oil and water repellent finish to textiles, wherein the fluorine efficiency of the fluorochemical treatment is improved. By "fluorine efficiency" is meant the ability to use a minimum amount of fluorochemicals to obtain desired textile repellency. In all instances herein, the term "(meth) acrylate" is used to denote either acrylate or methacrylate or mixtures thereof.

BACKGROUND OF THE INVENTION

Fluoropolymer compositions having utility as textile treating agents generally contain pendant perfluoroalkyl groups of three or more carbon atoms, which provide oil- and water-repellency when the compositions are applied to fabric surfaces.

Japan Patent 07179528 discloses a perfluoroalkyl acrylate polymer emulsion prepared by polymerizing in aqueous solution containing an organic solvent with higher flash point to reduce odor and pH. The organic solvent is described as an alkylene glycol monoalkyl ether mono carboxylic acid ester. The examples use 10% organic solvent relative to the water, but the text says 1–50% may be used. Improved fluorine efficiency is not disclosed or suggested.

U.S. Pat. No. 6,479,605 (Franchina) discloses a high-durability textile repellency composition made by polymerizing a perfluoro(meth)acrylate, a long-chain alkyl (meth) acrylate, a hydroxyethyl (meth)acrylate, an ethoxy (meth) acrylate, an N-methylol acrylamide, and optionally, vinylidene chloride and/or vinyl acetate. In the examples, the polymerization was carried out by emulsion polymerization in an aqueous solution containing 12.5% to 15% hexylene glycol relative to the water.

There remains a need for textile repellents with higher fluorine efficiency, that is, the ability to use a lower amount of fluorochemicals to obtain the desired textile repellency. The present invention provides such a composition.

SUMMARY OF THE INVENTION

The present invention comprises an improved process for producing an oil and water repellent finish for textiles which comprises emulsion polymerization of a perfluoro(meth) acrylate ester with one or more hydrophilic group-containing esters wherein the improvement comprises polymerization in an aqueous solution containing 0.1 to 4.9% by weight of dipropylene glycol monomethyl ether acetate ($CH_3O(CH_2)_3O(CH_2)_3OCOCH_3$) or propylene glycol diacetate ($CH_3OCO(CH_2)_3OCOCH_3$) relative to the water, wherein the copolymer is comprised of monomers copolymerized in the following percentages by weight:

(a) from about 50% to about 85% of a monomer of formula I:

$$R_f\text{—}CH_2CH_2\text{—}OC(O)\text{—}C(R)\text{=}CH_2 \qquad \text{I}$$

(b) from about 10% to about 25% of a monomer of formula II:

$$R_2\text{—}OC(O)\text{—}C(R)\text{=}CH_2 \qquad \text{II}$$

(c) from 0.1% to about 5% of a monomer of the formula III:

$$HO\text{—}CH_2CH_2\text{—}OC(O)\text{—}C(R)\text{=}CH_2 \qquad \text{III}$$

(d) from 0.1% to about 5% of a monomer of the formula IV:

$$H\text{—}(OCH_2CH_2)_m\text{—}O\text{—}C(O)\text{—}C(R)\text{=}CH_2 \qquad \text{IV}$$

(e) from 0.1% to about 3% of a monomer of the formula V:

$$HO\text{—}CH_2\text{—}NH\text{—}C(O)\text{—}C(R)\text{=}CH_2 \qquad \text{V}$$

(f) and optionally, from 0% up to about 10% of vinylidene chloride (formula VI) or vinyl acetate (formula VII), or a mixture thereof:

$$CH_2\text{=}CCl_2 \qquad \text{VI}$$

$$CH_3\text{—}(O)COCH\text{=}CH_2 \qquad \text{VII}$$

wherein $R_f$ is a straight or branched-chain perfluoroalkyl group of from about 2 to about 20 carbon atoms, each R is independently H or $CH_3$; $R_2$ is an alkyl chain from about 2 to about 18 carbon atoms; and m is 2 to about 10.

The present invention further comprises a method of treating a fabric or fabric blend comprising application to the surface of the fabric or fabric blend of a composition as described above.

The present invention further comprises a fabric or fabric blend which has been so treated. The treated fabric or fabric blend has a fluorine content of from about 0.05% to about 0.5% by weight.

DETAILED DESCRIPTION OF THE INVENTION

Trademarks and tradenames are indicated herein by capitalization. This invention comprises an improved process for producing fluorochemical copolymers useful for imparting repellent properties to fabrics or fabric blends. By "fabrics" is meant natural or synthetic fabrics composed of fibers of cotton, rayon, silk, wool, polyester, polypropylene, polyolefins, nylon, and aramids such as "NOMEX" and "KEVLAR." By "fabric blends" is meant fabric made of two or more types of fibers. Typically these blends are a combination of a natural fiber and a synthetic fiber, but also can include a blend of two natural fibers or of two synthetic fibers. Superior repellent properties, along with desirable properties of low yellowing and good durability are imparted to fabrics and fabric blends by the addition of certain fluorochemical copolymers. These are applied to the fabric in the form of a dispersion in water or other solvent either before, after or during the application of other fabric treatment chemicals. In particular, these fluorochemical polymers have a high fluorine efficiency in that the desired repellency is obtained using a low level of fluorochemical.

The copolymers of this invention are prepared by emulsion polymerization techniques using a particular solvent. The use of dipropylene glycol monomethyl ether acetate or propylene glycol diacetate during emulsion polymerization has been found to result in increased fluorine efficiency in the resultant polymer. As little as half the amount of fluoropolymer can be employed to achieve comparable repellence in the treated fabric or fabric blend. The surfactant employed to stabilize the emulsion during its formation and during polymerization is a cationic and/or non-ionic emulsifying agent or agents. Generally water, solvent, surfactant and monomers of formula I to V as detailed below are blended or homogenized. After cooling and sparging with inert gas, an initiator and optional compounds of formula VI or VII are added. The polymerization is conveniently initiated by azo initiators such as 2,2'-azobis(2-amidinopropane) dihydrochloride. These initiators are sold by E. I. du Pont de Nemours and Company, Wilmington, Del., commercially under the name of "VAZO", and by Wako Pure Industries, Ltd., Richmond, Va., under the name "V-50." The reaction mixture is heated typically to about 50–55° C. for several hours to generate the desired copolymer.

The aqueous dispersions produced are applied to textile surfaces by known methods to impart oil-, soil- and water-repellency. A distinguishing feature of the fluoropolymers of the present invention is their high fluorine efficiency and high durability of the finish on the fabric. The high fluorine efficiency is obtained by emulsion polymerization using 0.1% to 4.9% of dipropylene glycol monomethyl ether acetate ($CH_3O(CH_2)_3O(CH_2)_3OCOCH_3$) or propylene glycol diacetate ($CH_3OCO(CH_2)_3OCOCH_3$) relative to the water, wherein the copolymer is comprised of monomers copolymerized in the following percentages by weight relative to the total weight of copolymer:

(a) from about 50% to about 85% of a monomer of formula I:

$R_f$—$CH_2CH_2$—OC(O)—C(R)=$CH_2$ I (b) from about 10% to about 25% of a monomer of formula II:

$R_2$—OC(O)—C(R)=$CH_2$ II (c) from 0.1% to about 5% of a monomer of the formula III

HO—$CH_2CH_2$—OC(O)—C(R)=$CH_2$ III (d) from 0.1% to about 5% of a monomer of the formula IV:

H—$(OCH_2CH_2)_m$—O—C(O)—C(R)=$CH_2$ IV (e) from 0.1% to about 3% of a monomer of the formula V:

HO—$CH_2$—NH—C(O)—C(R)=$CH_2$ V (f) and optionally, from 0% up to about 10% of vinylidene chloride (formula VI) or vinyl acetate (formula VII), or a mixture thereof:

$CH_2$=$CCl_2$ VI $CH_3$—(O)COCH=$CH_2$ VII wherein $R_f$ is a straight or branched-chain perfluoroalkyl group of from 2 to about 20 carbon atoms, each R is independently H or $CH_3$; $R_2$ is an alkyl chain from 2 to about 18 carbon atoms; and m is 2 to about 10. Preferably the dipropylene glycol monomethyl ether acetate or propylene glycol diacetate is added before the emulsion is formed.

Preferably monomer (a) of formula I is a perfluoroalkylethyl acrylate with a perfluoroalkyl carbon chain length distribution by weight of about 50% of 8-carbon, about 30% of 10-carbon, about 10% of 12-carbon, and with smaller percentages of 6-carbon, 14-carbon and longer chain lengths. The proportion of monomer (a) of formula I is at least about 50% relative to the total weight of copolymer. The proportion of monomer (a) of formula I is less than about 85%. If it is present in higher amounts, the polymer becomes more costly. The proportion of monomer (a) of formula I in the copolymer is preferably between about 60% and about 80% by weight. This range is preferred for the best durability of oil-, water- and soil repellent properties in currently envisioned applications of treatment of fabrics and fabric blends. Other proportions may be more desirable for other applications.

The required monomer (b) of formula II in the present invention is one or a mixture of alkyl (meth)acrylates having chain lengths 2 to 18 carbons. These are added to the polymerization in proportions from 10% to about 25%. Preferably the proportion of monomer (b) in the copolymer is between about 10% and about 20% by weight. As used herein, "alkyl" refers to linear, branched-chain and cyclic alkyl groups. Examples of such monomers include ethyl acrylate, propyl acrylate, butyl acrylate, cyclohexyl acrylate, stearyl acrylate, lauryl acrylate, stearyl methacrylate, lauryl methacrylate, 2-ethylhexyl acrylate, and isodecyl acrylate. Of the foregoing, stearyl acrylate and stearyl methacrylate are most preferred.

It has been found that by incorporating the three monomers (c), (d) and (e) of formulas II, IV and V into the fluorinated polymer, the amount of vinylidene chloride can be decreased or eliminated while achieving comparable repellency and durability. Monomer (c) is a hydroxyethyl (meth)acrylate. Preferably it is hydroxyethyl methacrylate (HEMA). Monomer (d) is an ethoxylated (meth)acrylate wherein the number of ethoxy groups is between 2 and 10. Between 5 and 10 ethoxy groups are preferred. Monomer (e) is N-methylol acrylamide or methacrylamide. N-methylol acrylamide (MAM) is preferred.

The proportion of each of these monomers employed determines the softness of the product, the performance of the product across several substrates and the durability of the product. The proportion of each of these monomers is at least 0.1% by weight of the copolymer to provide the necessary durability and performance attributes. The percentage by weight of monomer (c) and (d) is each below about 5% by weight, and the percentage by weight of monomer (e) is below about 3% by weight. The utility of incorporating these three monomers into the polymer backbone is the efficient cross-linking between the various polymer chains upon cure. The cross-linking efficiency between polymer chains is especially important when dealing with synthetic fabrics where reactive groups on the surface may be at a very low concentration. In this case the durability of the finish would arise from the polymers linking around the individual fibers and thus be physically trapped rather than chemically bound to the fibers.

One of the advantages of the composition prepared according to this invention is its flexibility for a variety of uses. Its hydrophobic and oleophobic properties on a wide range of fabrics are varied for different applications by simply varying the relative amounts of monomers (a) (b) (c) (d) and (e), while still maintaining its properties as a durable, low yellowing repellent.

Optionally, the copolymer composition may also contain up to about 10% by weight of monomer (f); i.e., vinylidene chloride (formula VI) or vinyl acetate (formula VII), or a mixture thereof:

$CH_2$=$CCl_2$ VI

CH 3—(O)COCH=$CH_2$ VII

The addition of a relatively small amount of vinylidene chloride or vinyl acetate may be desirable to improve the compatibility of the copolymer with the fabric substrate, or to reduce overall costs. Preferably the amount of monomer (f) is below about 8% by weight. To have a noticeable effect on compatibility, either is present in a proportion of at least about 1%.

The repellent composition applied to the fabric may further contain a blocked isocyanate to promote durability, either as part of the copolymer (i.e., as a monomer), or added after copolymerization (i.e., as a blended isocyanate). It has been found that the fabric's hand (its feel when touched) is preferably soft if the blocked isocyanate is part of the copolymer. The fabric's hand can also be made softer by adding a softener to the application bath or product formulation. The desirability of adding a blocked isocyanate depends on the particular application for the copolymer. It does not need to be present to achieve satisfactory cross-linking between chains or bonding to the fibers. However, it is desirable for its contribution to increase fluorine efficiency. When added as a monomer it is present in a proportion of at least about 1% to have a noticeable effect on durability. Amounts up to 2% may be used. When added as a blended isocyanate, amounts up to 20% by weight are added.

Especially preferred for the blocked isocyanate is the monomer, 2-(0-[1'-methyl-propylideneamino]carboxyamino)ethyl methacrylate, of the formula below:

$$(CH_3)(CH_2CH_3)C{=}N{-}O{-}C(O){-}NH{-}CH_2{-}CH_2{-}OC(O)C(R){=}CH_2 \qquad \text{VIII}$$

wherein

R is H or $CH_3$.

The present invention further comprises a method of treating fabrics or fabric blends comprising application to the surface of the fabric or fabric blend of an effective amount of a copolymer composition prepared as described above. The copolymers are applied to the fabric or blended fabric to be treated from aqueous dispersions, either alone or in a mixture with other textile treatment agents or finishes. Due to the high fluorine efficiency of the copolymers, the amount needed is less than in prior art methods. For example when using a dipping or bath method, less than 1% on weight of bath is employed, preferably less than 0.65% on weight of bath. The dispersions are generally applied to textile fabrics by spraying, dipping, padding, or other well-known methods. After excess liquid has been removed, for example by squeeze rolls, the treated fabric is dried and then cured by heating, for example, to 100° C. to 190° C., for at least 30 seconds, typically 60–180 seconds. Such curing enhances oil-, water- and soil repellency and durability of the repellency. While these curing conditions are typical, some commercial apparatus may operate outside these ranges because of its specific design features. The treated fabric has a fluorine content of from about 0.05% to about 0.5% by weight.

The present invention further comprises a fabric or fabric blend which has been treated to impart oil- and water-repellent properties thereto by application of an effective amount of a copolymer prepared as described above. The treated fabric has a fluorine content of from about 0.05% to about 0.5% by weight. The treated fabric has superior oil- and water-repellencies, especially in terms of durability after washing and decreased yellowing of the fabric.

The copolymers and method of the present invention are useful to enhance oil-, water- and soil-repellency of fabrics and fabric blends during laundering. The repellency property is durable, and is especially effective for synthetic fabrics. The treated fabrics and fabric blends of the present invention are useful in a variety of applications such as for textiles, clothing, furnishings and the like. The copolymers of the present invention are advantageous in that they give highly durable, low yellowing repellent finishes over a wide range of fabrics or fabric blends. The copolymers prepared as described herein are used in low amounts due to their high fluorine efficiency.

TEST METHODS

The following tests were employed in evaluating the examples herein.

Fabric Treatment

The fabric was treated with the copolymer emulsion using a pad bath (dipping) process. A bath containing 0.2–2% of the fluorinated product, as detailed in the Tables in the Examples, was used to treat polyester and nylon fabrics, often in combination with a blocked extender (0–2%) and/or a softener (0–2%) as specified in the Examples. A wetting agent was also included in the bath at 0.2%. After application, the fabric was cured at approximately 160° C. for 1–3 minutes. The fabric was allowed to "rest" after treatment and cure.

Water Repellency

The water repellency of a treated substrate was measured according to the DuPont Technical Laboratory Method as outlined in the Teflon® Global Specifications and Quality Control Tests information packet. The test determines the resistance of a treated substrate to wetting by aqueous liquids. Drops of water-alcohol mixtures of varying surface tensions are placed on the fabric and the extent of surface wetting is determined visually. The test provides a rough index of aqueous stain resistance. The higher the water repellency rating, the better the resistance of a finished substrate to staining by water-based substances. The composition of standard test liquids is shown in the following table.

TABLE 1

Standard Test Liquids

| Water Repellency Rating Number | Composition, Vol. % Isopropyl Alcohol | Composition, Vol. % Distilled Water |
|---|---|---|
| 1 | 2 | 98 |
| 2 | 5 | 95 |
| 3 | 10 | 90 |
| 4 | 20 | 80 |
| 5 | 30 | 70 |
| 6 | 40 | 60 |
| 7 | 50 | 50 |
| 8 | 60 | 40 |
| 9 | 70 | 30 |
| 10 | 80 | 20 |
| 11 | 90 | 10 |
| 12 | 100 | 0 |

Water Repellency—Spray Rating

Water repellency can be further tested by utilizing the spray test method. The treated fabric samples were tested for water repellency by following the AATCC standard Test Method No. 22-1996, conducted as follows. A fabric sample, treated with an aqueous dispersion of polymer as previously described, is conditioned for a minimum of 2 hours at 23° C.+20% humidity and 65° C.+10% relative humidity. The fabric sample is securely fastened on a plastic/metal embroidery hoop such that the fabric is wrinkle-free. The hoop is placed on the testing stand so that the fabric is facing up. Then 250 mL of water at 80⁺−2° F. (27⁺−1° C.) is poured into the testing funnel allowing the water to spray onto the fabric surface. Once the water has run through the funnel, the hoop is rapped against the edge of a solid object with the fabric facing down, rotated 180 degrees and rapped again. The spotted or wetted surface is compared with the AATCC standards found in the AATCC Technical Manual. The more wet the surface, the lower the number and the poorer the repellency. A 100 denotes no wetting, a 90 denotes slight wetting (three small spots), an 80 denotes wetting signified by several (10) spots at the spray points, a 70 denotes partial wetting of the upper fabric surface, a 50 denotes wetting of the entire upper fabric surface, a 0 denotes complete wetting of the lower and upper fabric surface.

Oil Repellency

The treated fabric samples were tested for oil repellency by a modification of AATCC standard Test Method No. 118, conducted as follows. A fabric sample, treated with an aqueous dispersion of polymer as previously described, is conditioned for a minimum of 2 hours at 23° C.+20% relative humidity and 65° C.+10% relative humidity. A series of organic liquids, identified below in Table I, are then applied dropwise to the fabric samples. Beginning with the lowest numbered test liquid (Repellency Rating No. 1), one drop (approximately 5 mm in diameter or 0.05 mL volume) is placed on each of three locations at least 5 mm apart. The drops are observed for 30 seconds. If, at the end of this period, two of the three drops are still spherical in shape with no wicking around the drops, three drops of the next highest numbered liquid are placed on adjacent sites and similarly observed for 30 seconds. The procedure is continued until one of the test liquids results in two of the three drops failing to remain spherical to hemispherical, or wetting or wicking occurs.

The oil repellency rating of the fabric is the highest numbered test liquid for which two of the three drops remained spherical to hemispherical, with no wicking for 30 seconds. In general, treated fabrics with a rating of 5 or more are considered good to excellent; fabrics having a rating of one or greater can be used in certain applications.

TABLE 2

Oil Repellency Test Liquids

| Oil Repellency Rating Number | Test Solution |
|---|---|
| 1 | NUJOL Purified Mineral Oil |
| 2 | 65/35 Nujol/n-hexadecane by volume at 21° C. |
| 3 | n-hexadecane |
| 5 | n-dodecane |
| 6 | n-decane |

Note:
NUJOL is a trademark of Plough, Inc., for a mineral oil having a Saybolt viscosity of 360/390 at 38° C. and a specific gravity of 0.880/0.900 at 15° C.

Laundering Procedure

The fabric samples were laundered according to the U.S. Home Laundering Method outlined in the TEFLON Global Specifications and Quality Control Tests information packet. Fabric samples are loaded into a KENMORE automatic washer with a ballast load to give a total dry load of 4 lb. (1.0 kg). A commercial detergent is added (AATCC 1993 Standard Reference Detergent WOB) and the washer is filled to a high water level with warm water (105° F.)(41° C.). The samples and ballast are washed a designated number of times (5HW=5 washes, 10HW= 10 washes, etc.) using a 12-minute normal wash cycle followed by rinse and spin cycles. The samples are not dried between wash cycles.

After washing is complete, the wet fabric samples and ballast are transferred to a KENMORE automatic dryer and dried for 45 minutes at the high/cotton setting to achieve a vent temperature of 155–160° F. (68–71 □C).

EXAMPLES

The following examples were used in evaluating the properties of fabric and fabric blends treated with the copolymers prepared according to the present invention and comparative copolymers.

Example 1

To begin, (a) 219.4 g of a fluoromonomer having the formula: $CF_3CF_2(CF_2)_xC_2H_4OC(O)—C(H)=CH_2$, wherein x=6, 8, 10, 12, 14, 16, and 18 in the respective relative amounts of about 3%, 50%, 31%, 10%, 3% 2% and 1%, said monomer having a weight average molecular weight of 569; (b) 60.1 g of stearyl methacrylate; (c); 3 g (2 parts by weight) 2-hydroxyethyl methacrylate; (d) 5.7 g of poly(oxyethylene)7 methacrylate, (e) 5.7 g of N-methylol-acrylamide; 1.5 g of dodecyl mercaptan, 40 g Dowanol DPMA (dipropylene glycol methyl ether acetate) (Dow Chemical, Midland, Mich.), 28 grams of Tergitol 15-S-20 (Union Carbide, Danbury, Conn.), 14 grams of Arquad 16/29 (Akzo-Nobel, McCook, Ill.) and 619.5 g of water were emulsified and then charged to a four-necked flask fitted with a stirrer, thermocouple thermometer, and a dry ice or water condenser. Next, (f) 6 g of vinylidene chloride was added to the emulsion. The charge was purged with nitrogen at 40° C. for 30 minutes. Then, 1.6 g of "VAZO" 52 WSP (E. I. du Pont de Nemours and Company, Wilmington, Del.) was then added to initiate polymerization and the charge was stirred for 8 hours at 55° C. under nitrogen. The resulting polymer latex weighed 1151.3 g with solids content of 33%. The polymer emulsion was applied to the fabric as previously described at 1.5% concentration on the weight of the bath (owb). The fabric was tested for repellency using the test methods detailed above, and retested after several laundry cycles. Results are given in Table 3 below.

Comparative Example A

The procedure of Example 1 was repeated except that dipropylene glycol (Dow Chemical, Midland, Mich.) was used instead of dipropylene glycol methyl ether acetate.

Comparative Example B

The procedure of Example 1 was repeated except that dipropylene glycol methyl ether (Dow Chemical, Midland, Mich.)_was used instead of dipropylene glycol methyl ether acetate.

TABLE 3

| | Comp. Example A (dipropylene glycol) | Comp. Example B (dipropylene glycol monomethyl ether) | Example 1 (dipropylene glycol monomethyl ether acetate) |
|---|---|---|---|
| Bath Concentration | 1.5% owb | 1.5% owb | 1.5% owb |
| Oil Repellency on Polyester | | | |
| Initial | 5 | 6 | 6 |
| 5 HW* | 1 | 1 | 2 |
| 10 HW* | 1 | 1 | 1 |
| Water Repellency on Polyester | | | |
| Initial | 7 | 11 | 8 |
| 5 HW* | 4 | 3 | 5 |
| 10 HW* | 0 | 2 | 3 |
| Spray Repellency on Polyester | | | |
| Initial | 100 | 100 | 100 |
| 5 HW* | 90 | 70 | 100 |
| 10 HW* | 50 | 70 | 100 |

*number of laundry cycles using procedure described above

This data showed that superior spray repellency was obtained using the polymer prepared by the process of the present invention.

Example 2

The procedure of Example 1 was followed except that Ethoquad 18/25 (Akzo-Nobel, McCook, Ill.) was used as a surfactant.

Comparative Example C

The procedure of Example 2 was repeated except that dipropylene glycol was used instead of dipropylene glycol methyl ether acetate.

Comparative Example D

The procedure of Example 2 was repeated except that dipropylene glycol methyl ether was used instead of dipropylene glycol methyl ether acetate.

TABLE 4

| | Comp. Example C (dipropylene glycol) | Comp. Example D (dipropylene glycol monomethyl ether) | Example 2 (dipropylene glycol monomethyl ether acetate) |
|---|---|---|---|
| Bath Concentration | 1.5% owb | 1.5% owb | 1.5% owb |
| Oil Repellency on Polyester | | | |
| Initial | 5 | 6 | 6 |
| 5 HW* | 1 | 1 | 2 |
| 10 HW* | 1 | 1 | 2 |
| Water Repellency on Polyester | | | |
| Initial | 7 | 9 | 8 |
| 5 HW* | 4 | 3 | 5 |
| 10 HW* | 0 | 2 | 3 |
| Spray Repellency on Polyester | | | |
| Initial | 100 | 100 | 100 |
| 5 HW* | 90 | 80 | 100 |
| 10 HW* | 50 | 70 | 100 |

*number of laundry cycles using procedure described above

The repellency of the final products of Example 2 and Comparative Examples C and D were essentially unchanged from the comparable compositions in Table 3.

Example 3

15 The polymer emulsion made in Example 1 was used to treat the fabric at 0.65% on weight of both (owb) with a blocked isocyanate (0.15% owb) and softener (0.04% owb). Testing for repellency was conducted using the test methods described above, and retested after several laundry cycles. Results are given in Table 5 below.

Example 4

The polymer emulsion made in Example 2 was used to treat the fabric at 0.65% owb with a blocked isocyanate (0.15% owb) and softener (0.04% owb). Testing for repellency was conducted using the test methods described above and retested after several laundry cycles. Results are given in Table 5 below.

Comparative Example E

The polymer emulsion made in Comp. Example A was used to treat the fabric at 0.65% owb with a blocked isocyanate (0.15% owb) and softener (0.04% owb). Testing for repellency was conducted using the test methods described above and retested after several laundry cycles. Results are given in Table 5 below.

TABLE 5

| | Example 3 (dipropylene glycol monomethyl ether acetate) | Example 4 (dipropylene glycol monomethyl ether acetate) | Comp. Example E (dipropylene glycol) |
|---|---|---|---|
| Bath Concentration | 0.65% owb | 0.65% owb | 0.65% owb |
| Oil Repellency on Polyester | | | |
| Initial | 6 | 6 | 6 |
| 5 HW* | 5 | 5 | 4 |
| 10 HW* | 4 | 4 | 3 |
| Water Repellency on Polyester | | | |
| Initial | 9 | 9 | 9 |
| 5 HW* | 6 | 6 | 5 |
| 10 HW* | 4 | 4 | 3 |

TABLE 5-continued

| | Example 3 (dipropylene glycol monomethyl ether acetate) | Example 4 (dipropylene glycol monomethyl ether acetate) | Comp. Example E (dipropylene glycol) |
|---|---|---|---|
| Spray Repellency on Polyester | | | |
| Initial | 100 | 100 | 100 |
| 5 HW* | 100 | 100 | 90 |
| 10 HW* | 100 | 100 | 90 |

*number of laundry cycles using procedure described above

The data in Table 5 demonstrated that using less than half the level of fluoroproduct in the presence of the blocked isocyante provided superior durability of repellency when compared to the data in Tables 3 and 4.

Example 5

The procedure of Example 4 was repeated except that propylene glycol diacetate was used instead of dipropylene glycol methyl ether acetate and the fabric was treated at 1.5% on weight of bath. Testing for repellency was conducted using the test methods described above and retested after several laundry cycles. Results are given in Tables 6 and 7 below.

Comparative Examples F and G

Commercially available fabric treatment products containing a fluorinated polymer was used to treat the fabric at a level of 1.5% on weight of bath using the process of Example 4.

Testing for repellency was conducted using the test methods described above and retested after several laundry cycles. Results are given in Tables 6 and 7 below.

TABLE 6

| | Comp. Example F | Comp. Example G | Example 5 (propylene glycol diacetate) |
|---|---|---|---|
| Bath Concentration | 1.5% owb | 1.5% owb | 0.65% owb |
| Oil Repellency on Polyester | | | |
| Initial | 6 | 5 | 6 |
| 5 HW* | 5 | 5 | 6 |
| 10 HW* | 4 | 3 | 5 |
| Water Repellency on Polyester | | | |
| Initial | 9 | 8 | 9 |
| 5 HW* | 6 | 3 | 6 |
| 10 HW* | 4 | 2 | 4 |
| Spray Repellency on Polyester | | | |
| Initial | 100 | 100 | 100 |
| 5 HW* | 100 | 90 | 100 |
| 10 HW* | 90 | 70 | 100 |

*number of laundry cycles using procedure described above

TABLE 7

| | Comp. Example F | Comp. Example G | Example 5 (propylene glycol diacetate) |
|---|---|---|---|
| Bath Concentration | 1.5% owb | 1.5% owb | 0.65% owb |
| Oil Repellency on nylon | | | |
| Initial | 6 | 5 | 6 |
| 5 HW* | 6 | 5 | 6 |
| 10 HW* | 4 | 3 | 5 |
| Water Repellency on Polyester | | | |
| Initial | 9 | 8 | 9 |
| 5 HW* | 6 | 3 | 6 |
| 10 HW* | 4 | 2 | 4 |
| Spray Repellency on Polyester | | | |
| Initial | 100 | 100 | 100 |
| 5 HW* | 100 | 90 | 100 |
| 10 HW* | 90 | 70 | 100 |

*number of laundry cycles using procedure described above

The data in Tables 6 and 7 illustrated that half the amount of polymer of Example 5 was effective to maintain initial repellency and durability of the repellency after laundering compared to Comparative Examples F and G. This effect was obtained on a variety of fabrics.

What is claimed is:

1. An improved process for producing an oil and water repellent finish for textiles which comprises emulsion polymerization of a perfluoro(meth)acrylate ester with one or more hydrophilic group-containing esters wherein the improvement comprises polymerization in an aqueous solution containing 0.1 to 4.9% by weight of dipropylene glycol monomethyl ether acetate ($CH_3O(CH_2)_3O(CH_2)_3OCOCH_3$) or propylene glycol diacetate ($CH_3OCO(CH_2)_3OCOCH_3$) relative to the water, wherein the copolymer is comprised of monomers copolymerized in the following percentages by weight:

(a) from about 50% to about 85% of a monomer of formula I:

$$R_f—CH_2CH_2—OC(O)—C(R)=CH_2 \quad \text{I}$$

(b) from about 10% to about 25% of a monomer of formula II:

$$R_2—OC(O)—C(R)=CH_2 \quad \text{II}$$

(c) from 0.1% to about 5% of a monomer of the formula III $$HO—CH_2CH_2—OC(O)—C(R)=CH_2 \quad \text{III}$$

(d) from 0.1% to about 5% of a monomer of the formula IV:

$$H—(OCH_2CH_2)_m—O—C(O)—C(R)=CH_2 \quad \text{IV}$$

(e) from 0.1% to about 3% of a monomer of the formula V:

$$HO—CH_2—NH—C(O)—C(R)=CH_2 \quad \text{V}$$

(f) and optionally, from 0% up to about 10% of vinylidene chloride (formula VI) or vinyl acetate (formula VII), or a mixture thereof:

$$CH_2{=}CCl_2 \quad \text{VI}$$

$$CH_3{-}(O)COCH{=}CH_2 \quad \text{VII}$$

wherein $R_f$ is a straight or branched-chain perfluoroalkyl group of from about 2 to about 20 carbon atoms, each R is independently H or $CH_3$; $R_2$ is an alkyl chain from about 2 to about 18 carbon atoms; and m is 2 to about 10.

2. The process of claim 1 wherein $R_f$ in monomer (a) of formula I is:

$$CF_3CF_2(CF_2)_xC_2H_4OC(O){-}C(H){=}CH_2$$

wherein x=6, 8, 10, 12, 14, 16, and 18 in the respective relative amounts of about 3%, 50%, 31%, 10%, 3% 2% and 1%, and said monomer has a weight average molecular weight of about 569.

3. The process of claim 1 wherein monomer (b) is stearyl (meth)acrylate.

4. The process of claim 1 wherein monomer (c) is hydroxyethyl methacrylate.

5. The process of claim 1 wherein for monomer (d) m is between about 5 and about 10.

6. The process of claim 1 wherein monomer (e) is N-methylolacrylamide.

7. The process of claim 1 wherein a blocked isocyanate extender is added after the polymerization is carried out, but prior to application to the fabric.

8. The process of claim 1 wherein a silicone softener is added after the polymerization is carried out, but prior to application to the fabric.

* * * * *